United States Patent [19]

Sela

[11] Patent Number: 5,913,018
[45] Date of Patent: Jun. 15, 1999

[54] PRINT BAND RENDERING SYSTEM

[75] Inventor: Avichay Sela, Sunnyvale, Calif.

[73] Assignee: Adobe Systems Incorporated, Mountain View, Calif.

[21] Appl. No.: 08/685,498

[22] Filed: Jul. 24, 1996

[51] Int. Cl.[6] .................................................. G06K 15/00
[52] U.S. Cl. ......................... 395/116; 395/112; 395/114; 395/115
[58] Field of Search ..................................... 395/103, 116, 395/113, 114, 141, 117, 115; 358/300; 355/14, 244; 364/519

[56] References Cited

U.S. PATENT DOCUMENTS

| 5,129,049 | 7/1992 | Cuzzo et al. | 395/113 |
| 5,138,561 | 8/1992 | Crowe | 395/103 |
| 5,504,842 | 4/1996 | Gentile | 395/114 |
| 5,608,848 | 3/1997 | Walker | 395/116 |

*Primary Examiner*—Amelia Au
*Assistant Examiner*—Vikkram Bali
*Attorney, Agent, or Firm*—Fish & Richardson P.C.

[57] ABSTRACT

A method and apparatus for efficiently rendering and printing bands of image information defined by a page description language. The invention estimates the print time for each print band sufficiently in advance to control a page-oriented output device print engine. In a first embodiment, the present invention controls the speed of the print engine for each page to be printed, based on a "rendering cost" or rasterization time estimate for some or all of the bands on each page. In a second embodiment, the present invention controls the speed of the print engine for each band to be printed, based on a "rendering cost" or rasterization time estimate for each band. An additional aspect of the present invention is that the print engine can be sped up for empty or sparse pages or bands, thus improving overall print speed. A third variation of the invention controls the speed of the print engine between groups of bands ("subpages") when the engine speed cannot be changed for each band, but can be changed for spaced-apart bands or groups of bands. In each case, the print speed is matched to the rendering speed to eliminate or reduce the need to pre-render, compress, and decompress page description language print information. By rendering and printing each band of data "on the fly", memory requirements are reduced. Print speed is optimized by providing band print data "on the fly" while maintaining the highest print engine speed possible for the complexity of particular data.

27 Claims, 8 Drawing Sheets

PRINT BAND RENDERING SYSTEM

BACKGROUND OF THE INVENTION

1. Field of the Invention

This invention relates to page-oriented output devices, and more particularly to a method and apparatus for efficiently rendering and printing bands of image information defined by a page description language.

2. Description of Related Art

Page-oriented output devices, such as laser printers, commonly receive data in page description language form before starting the printing process. With a page description language (PDL), a page is represented using graphics, text, and images that can be specified to be located anywhere on the page, and in any order, using successive commands of the language. The PDL commands reflect the way the page is composed. However, before printing, the received data must be rasterized so the page print mechanism ("print engine") in the printer can print the page while moving the print media (e.g, paper) uniformly in one direction, usually top to bottom.

Rasterization is the process of converting data that represent a page or portion of a page into a series of individual dots or pixels across the printed page to form a raster scanline, producing successive scanlines one after another down the page. The complete set of scanlines for a page is the raster data for the page. Rasterization is performed in the page printer by a raster generator.

Many page printers rasterize and store the entire raster data for a page before starting to send data to the print engine of the printer. The print engine runs at a predetermined speed. Therefore, precomputing the entire page of raster data ensures that each raster scanline is ready to send when needed by the print engine.

To store the raster data for an entire page may require substantial memory. Laser printers commonly have about 80 square inches of graphic information printed on a page at a resolution of 300 dots per inch, both horizontally and vertically. With one bit indicating each dot to be printed or left unprinted, over 875K bytes are required to store the raster data for an entire page. To increase the printer speed, a second page of raster data may be computed and stored in additional memory as the raster data for the first page is being sent incrementally to the print engine. Having a second page doubles the memory requirements.

New printer technology is enabling 600×600 dot (or pixel) resolution continuous tone color printing, which may require 24 bits per pixel or more. If full-page storage is used to meet high resolution color requirements, over 80 million bytes of memory per page are required; 160 million bytes of memory are thus required for storing two pages. This is expensive, even relative to the cost of a high-performance color printer. The memory requirements become even worse for higher resolution printers.

For low-end printers, the memory requirements are less, but the portion of the cost of the memory relative to other printer costs is higher. To provide users with improved printers at lower cost, memory requirements must be reduced.

Several methods have been employed to reduce printer memory requirements while minimizing "printer overrun" errors. A printer overrun error occurs when rasterization does not keep up with the predetermined speed of the print engine. A printer overrun prevents printing the remainder of the page. One method, taught by Cuzzo, et al., in U.S. Pat. No. 5,129,049, is to store the second page in a format that is more compact than a raster image, so the memory required for it is less than that required for the first full page raster image. The second page could be stored in its original PDL command representation, but doing so would not yield the advantage of overlapping the processing time for rasterizing the second page while the first page is being printed. Instead, the PDL commands for the second page are converted on input to an intermediate representation called a "display list." A display list is a sequence of display list commands. Display list commands are relatively simple drawings commands that are faster to rasterize than the original PDL commands. However, the display list page representation is more compact than a full page of raster data.

Display list commands for the page can be sorted by their position on the page as they are created. By sorting, the display list commands for a page can be separated into multiple sublists. Each sublist is localized for a particular area of the page. This results in display list commands being localized for each area, which leads to another method of saving memory described below.

Rather than rasterize the entire display list for a page before printing, the page is divided into horizontal strips or bands, and only some of the bands are rasterized before the start of the printing process. All the information for a particular band is contained in the display list commands for that band. Subsequent bands are rasterized after printing has started but before they are required by the print engine. By measuring or estimating the rasterization times and keeping track of the running total, some bands may be allowed to take longer to rasterize than others of the same size, so long as the cumulative time stays ahead of the print engine. This is described in the Cuzzo, et al patent referenced above and incorporated herein by reference. If the rasterization time for rasterization-on-the fly is too large, then one or more bands may be completely pre-rasterized. This approach helps ensure that the printing process will not fail due to running out of rasterization time, avoiding printer overruns.

For example, referring to FIG. 1, a page printer receives PDL commands 2 and converts the PDL command to display list commands 4. The display list commands 4 are stored in band representations that correspond to bands 8-1 through 8-10 on the printed page. If display list storage capacity becomes a limiting factor, display list commands 4 are converted to raster data or compressed raster data in band representations 6-1 through 6-10. Collectively, the band representations 6-1 through 6-10 form an intermediate page representation 10 of the data describing a printed page 12. The page 12 is printed by sequentially converting the various band representations 6-1 through 6-10 to raster data. Raster data for a raster scanline or band temporarily may be stored in a raster buffer 14 before printing.

The page data is received from a host computer as a sequence of PDL commands 2. The PDL commands 2 may include a combination of text and graphics commands as well as embedded imagery. Any individual PDL command may place text, graphics, or imagery on any part of the page, so that printing cannot begin until all of the PDL commands 2 for an entire page have been received and processed.

In the illustrated example, the page is logically divided into ten lateral bands 8-1 through 8-10. Each band has predefined upper and lower boundaries across the page. The bands typically are of equal size (but need not be). Each PDL command is translated, as it is received, into a series of display list commands 4. The display list commands 4 are generated so that each such command pertains only to a single band. Thus, if the print contribution from a PDL command 2 extends vertically over the whole page, it will result in at least one display list command 4 being generated in correspondence with each page band 8-1 through 8-10. If memory becomes a limitation, display list commands 4 for a band may be converted to another type of data representing the band, but if memory is not a limiting factor, all the presentations 6-1 through 6-10 will be in the form of display list commands 4 upon completion of the input of PDL commands 2.

Ultimately, the print engine requires a raster data representation for each band which may be stored in the raster buffer 14. In the raster data representation, the page 12 is described as a matrix of numbers, each number corresponding to a single pixel or dot to be printed on the page. The number value gives the color or intensity to be printed at that point.

While avoiding printer overruns and minimizing average memory requirement, such prior art methods still are subject to running out of memory for difficult cases. Accordingly, in co-pending patent application Ser. No. 08/021,190 entitled "Method and Apparatus for Saving Printer Memory" and assigned to the assignee of the present invention (herein incorporated by reference), an improved method is taught for overcoming such problems. In that method, data is supplied to the printer as a series of PDL commands. The PDL commands are converted by the raster generator upon input to an intermediate display list of drawing primitives that are then divided and sorted into commands associated with a plurality of bands. Depending upon the memory demands of the data for a particular page, the raster generator will keep each band in its display list representation or convert it into one of several other intermediate representations.

If, during input, the display list representation of the data fills the memory allotted to its storage, one or more of the bands is converted from display list format to raster format and compressed using a lossless compression algorithm. If storage of compressed bands subsequently exceeds available memory, raster data is further compressed using a lossy compression algorithm which can be assured to produce data sets that will fit within the memory allotment. Then additional display list commands are rasterized by decompressing the compressed bands, processing the new display list commands and recompressing the data using lossless or lossy compression as required. The time to rasterize each band can be estimated by the processor and stored, or the processor may actually compute and store the time for each band. Should memory for the compressed bands overflow at any point in the process, then the rasterizing times for the remaining bands may be determined or estimated and then stored without storing the raster output. Based on the stored rasterizing times, the processor determines for each band whether to rasterize it to the print engine on the fly, to pre-compute and store it as a lossless compressed raster data, to revert to a lossy-compressed pre-computed version, or to store it as uncompressed raster data.

However, while solving many of the problems of the prior art, the method described in the co-pending patent application requires greater computational complexity. The need to conditionally pre-render, compress, and/or decompress PDL print information means that computational resources are consumed that could have been used in simply rendering the PDL print information.

Thus, the present invention recognizes that it would be desirable to have a simpler method of controlling the print-ing of complex PDL pages that eliminates or reduces the need to pre-render, compress, and/or decompress PDL print information.

SUMMARY OF THE INVENTION

The present invention takes advantage of the recognition that an estimate of the print time for each band of image information defined by a page description language (PDL) can be generated sufficiently in advance to control the speed of a page printer print engine. More specifically, in a first embodiment, the present invention controls the speed of the print engine for each page to be printed, based on a "rendering cost" or rasterization time estimate for some or all of the bands on each page. In a second embodiment, the present invention controls the speed of the print engine for each band to be printed, based on a "rendering cost" or rasterization time estimate for each band. An additional aspect of the present invention is that the print engine can be sped up for empty or sparse pages or bands, thus improving overall print speed.

A third variation of the invention controls the speed of the print engine between groups of bands ("subpages") when the engine speed cannot be changed for each band, but can be changed for spaced-apart bands or groups of bands.

In each case, the print speed is matched to the rendering speed to eliminate or reduce the need to pre-render, compress, and decompress PDL print information. By rendering and printing each band of data "on the fly", memory requirements are reduced. Print speed is optimized by providing band print data "on the fly" while maintaining the highest print engine speed possible for the complexity of particular data.

The details of the preferred embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Overview

The present invention takes advantage of the recognition that an estimate of the print time for each band of image information defined by a page description language can be generated sufficiently in advance to control the speed of a page printer print engine. More specifically, in a first embodiment, the present invention controls the speed of the print engine for each page to be printed, based on a "rendering cost" or rasterization time estimate for the bands on each page. In a second embodiment, the present invention controls the speed of the print engine for each band to be printed, based on a "rendering cost" or rasterization time estimate for each band. A third variation of the invention controls the speed of the print engine between groups of bands ("subpages") when the engine speed cannot be changed for each band, but can be changed for spaced-apart bands or groups of bands. In all cases, the print speed is matched to the rendering speed to eliminate or reduce the need to pre-render, compress, and decompress PDL print information.

By rendering and printing each band of data "on the fly", memory requirements are reduced. By providing such band print data "on the fly" (also known as "racing the engine") while maintaining the highest print engine speed possible for the complexity of data, print speed is optimized.

Machine Architecture

Figure 1:
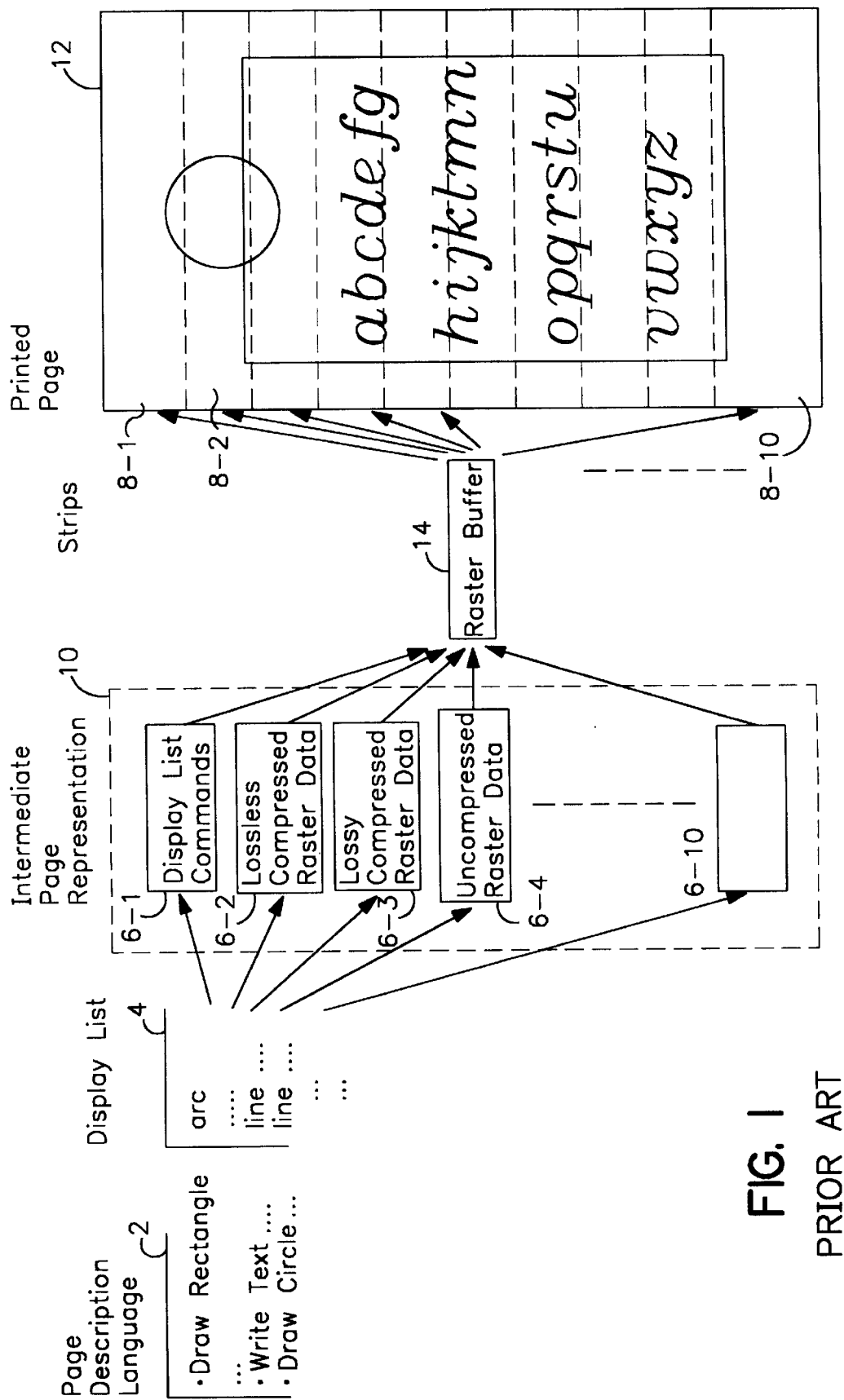
FIG. 1 is a block diagram of a prior art system showing a transformation of a page image, defined in a page description language, to a bitmapped printed image.
Figure 2:
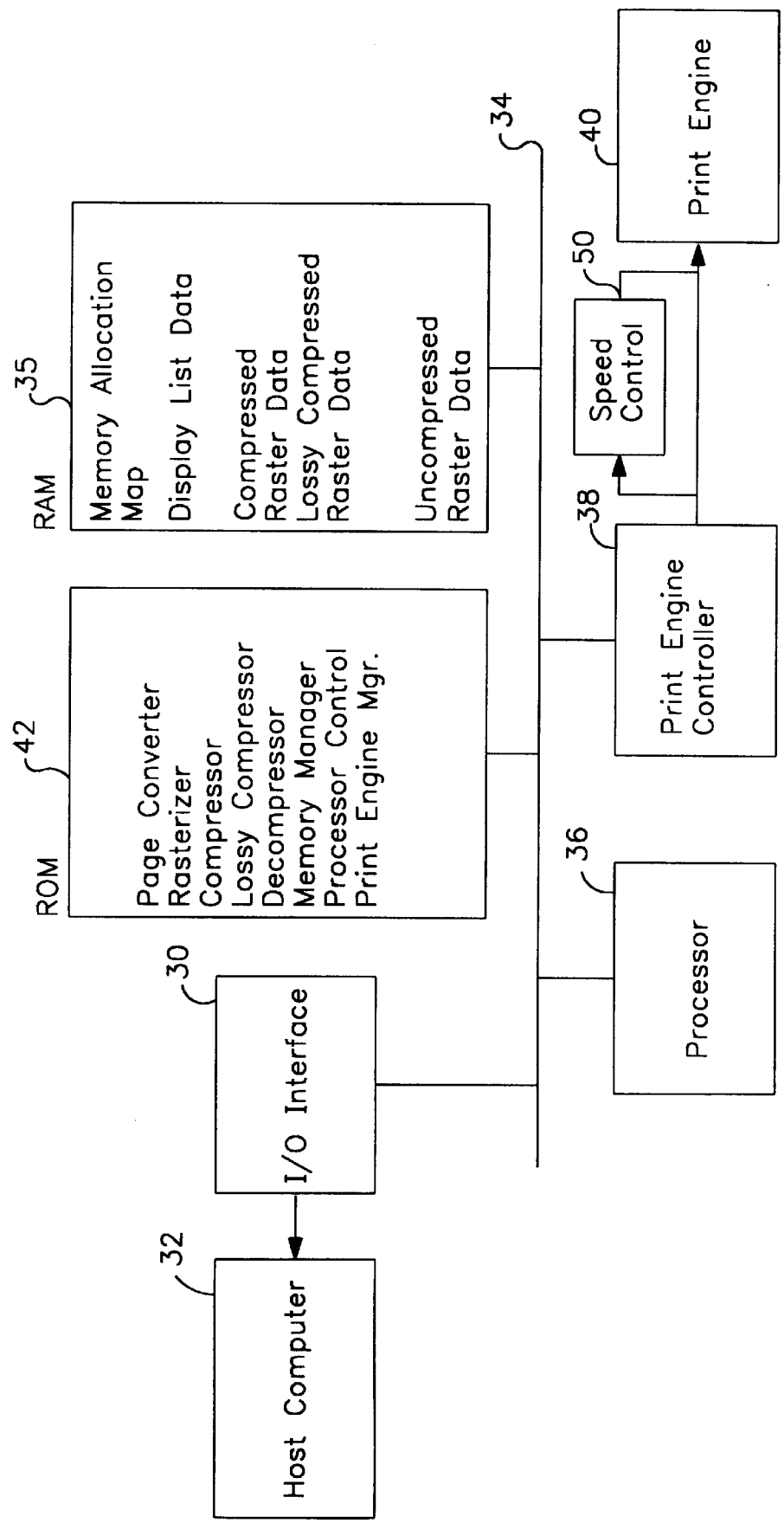
FIG. 2 is a block diagram of a printer that embodies the invention.

FIG. 2 is a block diagram of a printer that embodies the invention. A printer embodying the invention includes an input/output (I/O) interface 30 for receiving PDL commands over a bus, cable, or network from a host computer 32. The I/O interface 30 outputs the PDL commands to a common bus 34. Error messages and control information relating to the transfer of data is communicated back to the host computer 32 via the I/O interface 30. As each PDL command is received, it is stored in random access memory (RAM) 35 over the common bus 34. A processor 36 on the common bus 34 provides the computation and control for generating raster data and supplying the raster data to a print engine controller 38, which in turn passes the raster data to a page print engine 40 that applies the image to the print media.

The programs for the processor 36 preferably are permanently stored in a read-only memory (ROM) 42. Listed by way of example only are program names for a page converter program, rasterizer, etc. Input data, intermediate results including the various possible intermediate page representations, raster buffer data for the current decompressed band to be sent to the print engine controller 38, and all other variable data are stored in the RAM 35 (the list of items shown is by way of example only).

The processor 36, ROM 42, RAM 35 and common bus 34 work together as a raster generator to convert the input PDL commands to raster data driving the print engine controller 38. A standard commercial microprocessor, such as the Motorola 68000 family or the Intel i960 family, may be used as the processor 36. The RAM 35 may be conventional dynamic random access memory (DRAM) semiconductor chips. Other required components are conventional commercial digital semiconductor chips or application specific integrated circuits (ASICs) known in the art and coupled using conventional printed circuit interconnection technology.

First Preferred Embodiment

To this point, FIG. 2 shows elements described in co-pending patent application Ser. No. 08/021,190. Added is control by the print engine controller 38 of speed control circuitry 50 coupled to the print engine 40 and capable of regulating the speed of the print engine 40—and thus band print times—and the modulation of the raster scan print mechanism (typically, a laser beam, but including other raster scan print mechanisms used in page printers, such as ion beams, LCD shutters, etc.). (Line printers, such as dot matrix and ink jet printers, differ from page printers in that the print mechanism can be stopped at any time until data catches up. Once the print media begins to feed through a page printer, the entire print process must continue. If print data is not available, blank areas appear on the page.) The speed control circuitry 50 may be implemented as part of the print engine controller 38 or as part of the print engine 40.

In a first embodiment, the present invention controls the speed of the print engine 40 for each page to be printed, based on a "rendering cost" estimate for each band on a page. Whereas prior art page printers run at constant speed, the present invention adjusts the print engine speed for each page. In the preferred embodiments, the engine speed is stepped in easy-to-achieve amounts, such as one-half, one-quarter, etc. For example, at half-speed, the rasterizer routines executed by the processor 36 will have twice as much time to generate the necessary bitmapped raster image data for each band to be printed.

The rendering cost estimate or rasterization time estimate for a page can be determined as in the prior art. Good estimates generally are obtained from empirically-determined formulas based on the parameters that drive the rasterization process. For example, empirical data can be generated from a large number of test PDL pages by correlating image complexity (e.g., number of total display list commands 4, number of intermediate page representations 6 per band, type of display list command—arcs may require more time than lines, combinations of above, etc.) with rasterization time (taking into account, for example, of processor 36 speed, I/O speed, print engine speed, etc.). Alternatively, rasterization can be performed without storing the raster data (thus not consuming memory), and the actual rendering time determined. A combination of partial rasterization and extrapolation can also be used.

Upon determining rendering cost estimates for the bands on a page, a command is sent by the processor 36 to the print engine controller 38 to set the speed control circuitry 50 at a desired speed level so that, in general, the rasterized data for the entire page can be generated and transmitted to the print engine 40 "on the fly" (of course, if no speed change is required, the print engine 40 may default to a pre-set speed and no command need be transmitted). Accordingly, in general, there is no need to pre-render, compress, and/or decompress PDL print information. For example, if the time $T_i$ required to render the "slowest" band of a page is twice the normal band print time $T_E$ for a particular print engine 40, the print engine 40 can be commanded to advance the print media within its print path at half-speed.

Figure 3:
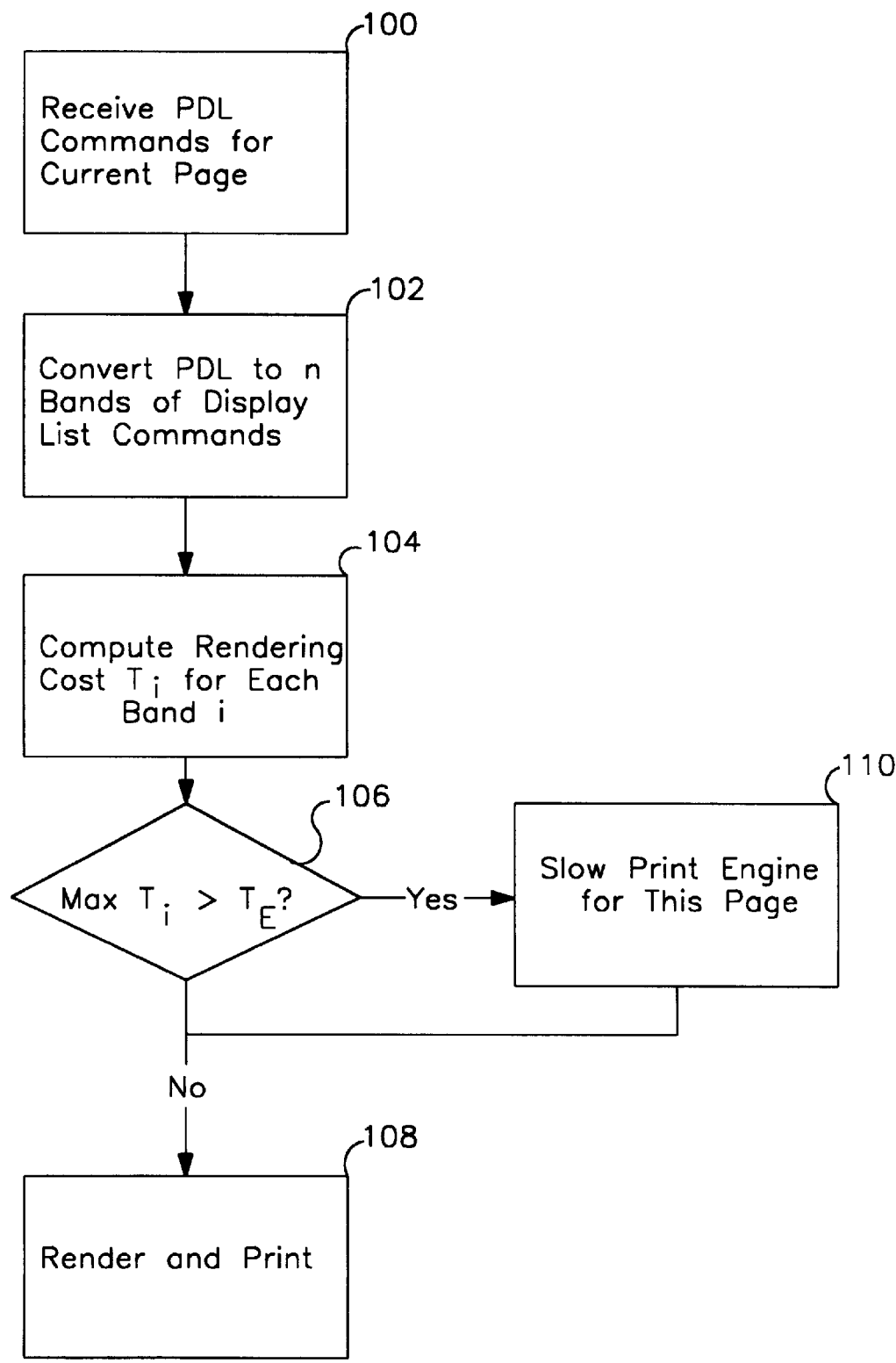
FIG. 3 is a flowchart showing the steps of a simplified version of the first preferred embodiment of the present invention.

FIG. 3 is a flowchart showing the steps of a simplified version of the first preferred embodiment of the present invention. Page description language commands 2 for a current page are received by the printer from a host (STEP 100). The printer converts the PDL commands to n bands of display list commands 4 (STEP 102). For each band i (i=1, . . . n), a rendering cost $T_i$ is computed (STEP 104). In this embodiment, if the maximum $T_i$ is less than or equal to the nominal band print time $T_E$ (STEP 106), then rendering and printing proceed normally (STEP 108). The whole page is output with the print engine 40 set at its nominal print speed.

However, if the maximum $T_i$ is greater than the nominal band print time $T_E$ (STEP 106), then the speed control circuitry 50 is set to cause the print engine 40 to slow its print process down such that the resulting $T_E$ is greater than or equal to the maximum $T_i$ (usually simply by controlling the print media feed mechanism) (STEP 110). In general, the print engine 40 must be slowed sufficiently to permit complete rendering and printing of the page. Thereafter, rendering and printing proceed normally (STEP 108). The whole page is output with the print engine 40 set at a lower than normal print speed.

An additional aspect of this embodiment of the present invention is that the print engine 40 can be sped up for empty or sparse pages, thus improving overall print speed. This is achieved simply by determining that a page has no or few display list commands 4 to print. For example, if maximum $T_i=0$, in Step 110 of FIG. 3 the print engine speed is increased rather than decreased for that page.

Figure 4:
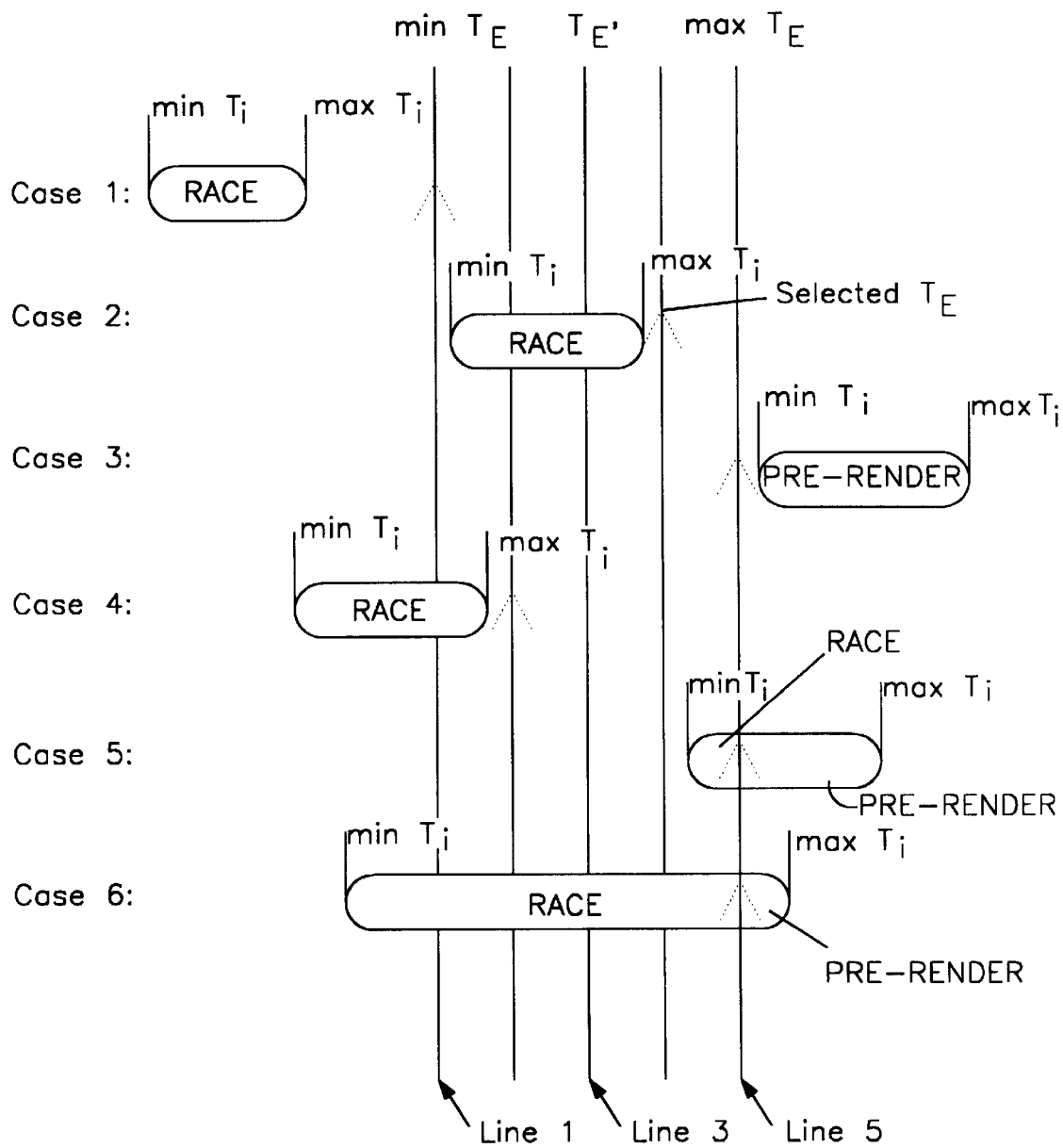
FIG. 4 is a timing diagram showing relative band rendering costs versus print engine times for six possible cases for the first preferred embodiment of the present invention.

A more sophisticated version of this embodiment of the present invention is described in conjunction with FIG. 4. FIG. 4 is a timing diagram showing relative band rendering costs versus print engine times for six possible cases for the first preferred embodiment of the present invention. The vertical lines indicate a set $S_E$ of band print times $T_E$, ranging from a minimum $T_E$ (line 1) to a maximum $T_E$ (line 5). Any particular print engine 40 may have fewer or more band print times, so long as the print engine 40 has at least two available band print times $T_E$. The print engine 40 may have a "nominal" band print time $T_E'$ anywhere between min $T_E$ and max $T_E$; in the example shown, $T_E'$ is line 3. Each case represents a printing strategy for a set of rendering costs $T_i$ that have been computed for all of the bands on a page and sorted from a minimum $T_i$ to a maximum $T_i$.

Case 1 shows a situation where all of the rendering costs $T_i$ for a page are less than the minimum $T_E$ (i.e., max $T_i$<min $T_E$). In this case, the band print time of the print engine 40 preferably is set to less than $T_E'$, and most preferably is set to the minimum $T_E$ (i.e., fastest printing), since all of the bands can be rendered on-the-fly, thus "racing" the print engine 40 for the entire page.

Case 2 shows a situation where all of the rendering costs $T_i$ for a page are greater than or equal to the minimum $T_E$ but less than or equal to the maximum $T_E$ (i.e., min $T_E \leq T_i \leq$ max $T_E$). In this case, the band print time of the print engine 40 preferably is set to the lowest $T_E$ that is greater than or equal to the maximum $T_i$. All of the bands can be raced relative to that selected $T_E$.

Case 3 shows a situation where all of the rendering costs $T_i$ for a page are greater than the maximum $T_E$ (i.e., max $T_E$<min $T_i$). In this case, none of the bands can be rendered within the slowest available print engine speed (maximum $T_E$). Accordingly, the best strategy is to pre-render all of the bands in memory (possibly using compression), and set the band print time of the print engine 40 to less than the maximum $T_E$, preferably to less than $T_E'$, and most preferably to the minimum $T_E$, for fastest printing.

Case 4 shows a situation similar to case 2, where all of the rendering costs $T_i$ for a page are less than or equal to the maximum $T_E$, but some rendering costs $T_i$ are less than the minimum $T_E$ E (i.e., min $T_i$<min $T_E$<max $T_i$<max $T_E$). In this case, the band print time of the print engine 40 preferably is set to the lowest $T_E$ that is greater than or equal to the maximum $T_i$. All of the bands can be raced relative to that selected $T_E$.

Case 5 shows a situation where some of the rendering costs $T_i$ for a page are greater than, and some are less than or equal to, the maximum $T_E$ (i.e., min $T_E \leq$ min $T_i \leq$ max $T_E$<max $T_i$). In this case, the band print time of the print engine 40 preferably is set to be the "best" $T_E$ that still allows racing of all bands where $T_i \leq T_E$ (that is, the lowest $T_E$ that is greater than or equal to the maximum $T_i$ for all $T_i$ that are less than or equal to max $T_E$). As an alternative option that is simpler to determine, the band print time of the print engine 40 preferably is set to be greater than $T_E'$, and most preferably is set to the maximum $T_E$ (i.e., slowest printing), as shown in FIG. 4. All of the bands having a $T_i$ greater than the selected $T_E$ are pre-rendered in memory (possibly using compression) before printing. All of the bands having a $T_i$ less than or equal to the selected $T_E$ can be raced.

Case 6 shows a situation similar to case 5, where some of the rendering costs $T_i$ for a page are greater, and some are less, than the maximum $T_E$, and some of the rendering costs $T_i$ are even less than minimum $T_E$ (i.e., min $T_i$<min $T_E$, max $T_E$<max $T_i$). In this case, the band print time of the print engine 40 preferably is set to be the "best" $T_E$ that still allows racing of all bands where $T_i \leq T_E$ (that is, the lowest $T_E$ that is greater than or equal to the maximum $T_i$ for all $T_i$ that are less than or equal to max $T_E$). As an alternative option that is simpler to determine, the band print time of the print engine 40 preferably is set to be greater than $T_E'$, and most preferably is set to the maximum $T_E$, as shown in FIG. 4. As in case 5, all of the bands having a $T_i$ greater than the selected $T_E$ are pre-rendered in memory (possibly using compression) before printing. All of the bands having a $T_i$ less than or equal to the selected $T_E$ can be raced.

Sub-optimum but still beneficial values of $T_E$ can be selected if desired. For example, in cases 2 and 4, a slower print band time (higher $T_E$) could be selected rather than the lowest $T_E$ that is greater than the maximum $T_i$.

Figure 5:
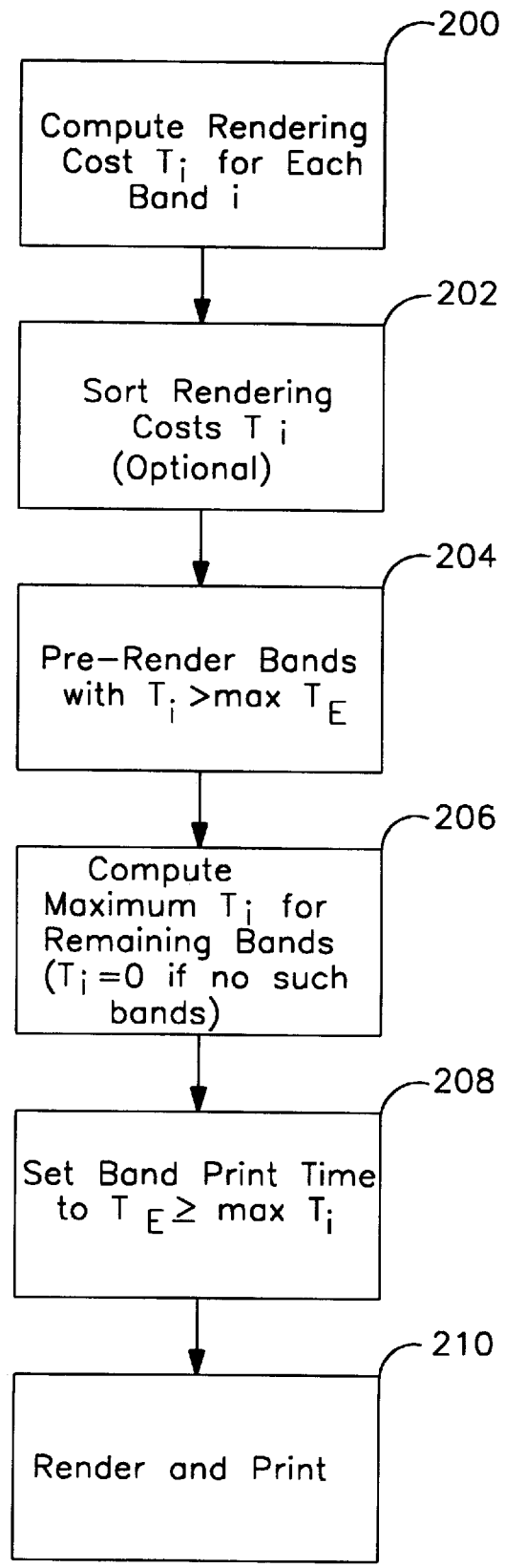
FIG. 5 is a flowchart showing the steps of a sophisticated version of the first preferred embodiment of the present invention.

Each of the cases described above can be implemented in a manner similar to the flowchart shown in FIG. 3, taking into account tests for each of the conditions specified above and shown in FIG. 4. However, the following procedure, shown in FIG. 5, is mathematically equivalent and is the preferred method of implementing the first embodiment of the present invention:

(1) compute the rendering costs (time) $T_i$ for all bands on a page (Step 200);

(2) sort the rendering costs from a minimum $T_i$ to a maximum $T_i$ (Step 202) (this step is optional, and is for ease of computation of the remaining steps);

(3) pre-render all bands with $T_i$>max $T_E$ (Step 204);

(4) compute max $T_i$ for the bands with $T_i \leq$ max $T_E$; set max $T_i$ to 0 if no such bands exist (i.e., all bands are pre-rendered, so the print engine can be set to its highest speed) (Step 206);

(5) set the band print time $T_E$ of the print engine 40 to be greater than the computed max $T_i$, and preferably to the lowest $T_E \geq$ max $T_i$ (Step 208); and (6) print the page band-by-band, rendering the unrendered bands in order (Step 210).

Second Preferred Embodiment

Figure 6:
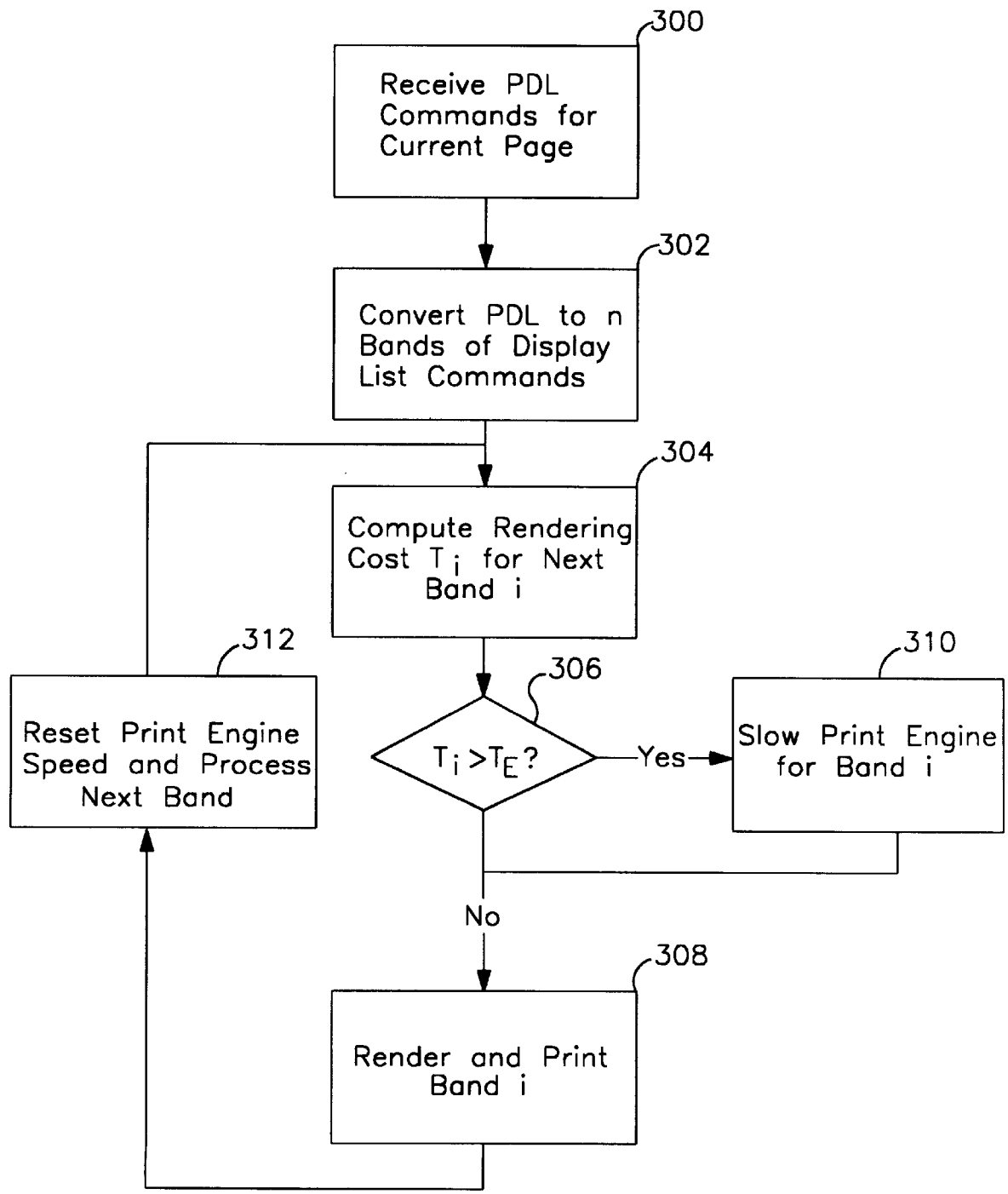
FIG. 6 is a flowchart showing the steps of a simplified version of the second preferred embodiment of the present invention.

In a second embodiment, the present invention controls the speed of the print engine for each band to be printed, based on a rendering cost or rasterization time estimate for each band. FIG. 6 is a flowchart showing the steps of a simplified version of the second preferred embodiment of the present invention. Page description language commands 2 for a current page are received by the printer from a host (Step 300). The printer converts the PDL commands to n bands of display list commands 4 (Step 302). For each band i (i=1, . . . , n), a rendering cost $T_i$ is computed (Step 304). In this embodiment, if each $T_i$ is less than or equal to the nominal band print time $T_E$ (Step 306), then rendering and printing for that band proceed normally (Step 308).

However, if $T_i$ is greater than the nominal band print time $T_E$ (Step 306), then the speed control circuitry 50 is set to cause the print engine 40 to slow its print process down such that the resulting $T_E$ is greater than or equal to $T_i$ (Step 310). In general, the print engine 40 must be slowed sufficiently to permit complete rendering and printing of the current band. Thereafter, rendering and printing for that band proceed normally (Step 308). The speed of the print engine is then reset to its nominal value (this step is optional) and the process repeats for the next band i until all bands are rendered and printed (Step 312).

The steps depicted in FIG. 6 can be done in other orders. For example, the rendering cost estimates $T_i$ can be computed for all of the bands n at one time, rather than band by band, so that it is known which bands require slowing the print engine 40 before any data is sent to the print engine.

An additional aspect of this embodiment of the present invention is that the print engine 40 can be sped up for empty or sparse (i.e., $T_i$ is less than $T_E$) bands, thus improving overall print speed. This is achieved simply by determining that a band has no or few display list commands 4 to print. For example, if $T_i=0$, in Step 310 of FIG. 6 the print engine speed is increased rather than decreased for that band, speeding the print engine through the band.

Figure 7:
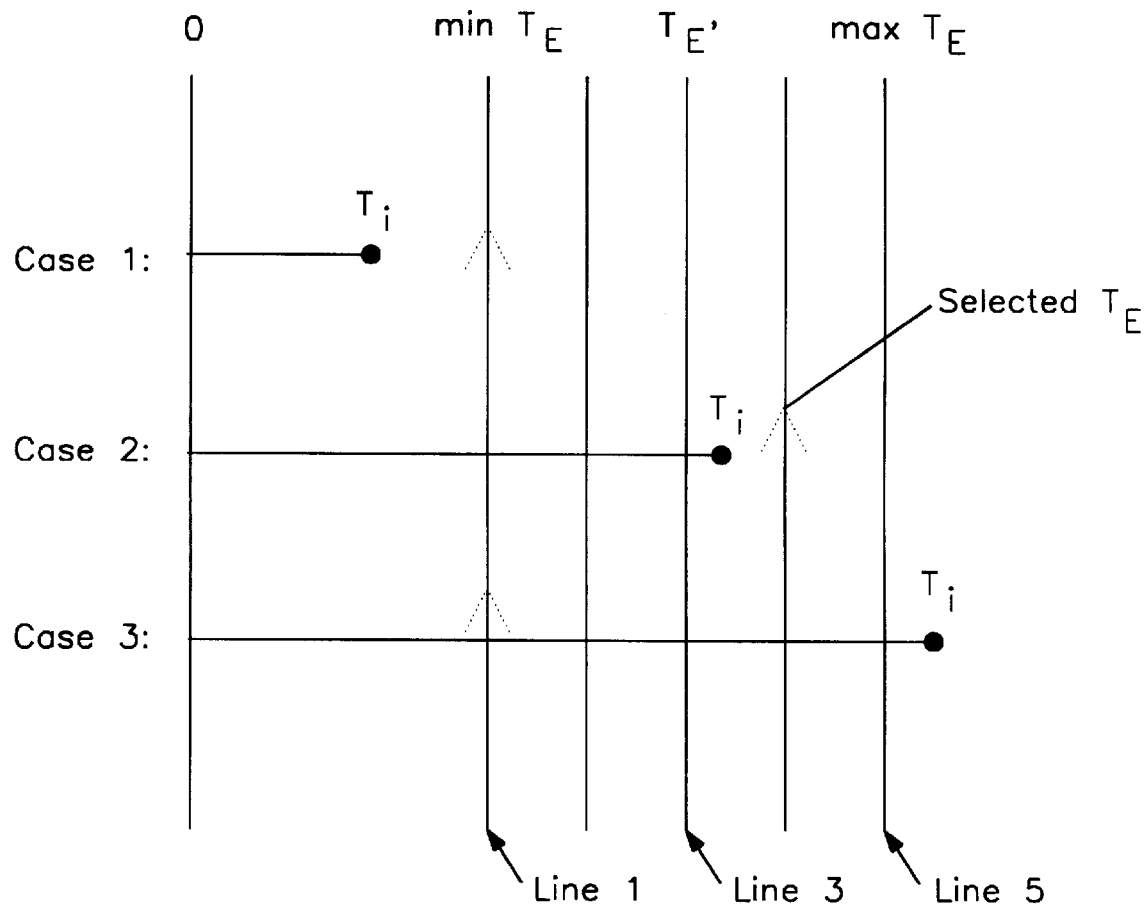
FIG. 7 is a timing diagram showing relative band rendering costs versus print engine times for three possible cases for the second preferred embodiment of the present invention.

A more sophisticated version of this embodiment of the present invention is described in conjunction with FIG. 7. FIG. 7 is a timing diagram showing relative band rendering costs versus band print times for three possible cases for the second preferred embodiment of the present invention. The vertical lines indicate a set $S_E$ of band print times $T_E$, ranging from a minimum $T_E$ (line 1) to a maximum $T_E$ (line 5). Again, any particular print engine 40 may have fewer or more band print times, so long as the print engine 40 has at least two available band print times $T_E$. The print engine 40 may have a "nominal" band print time $T_E'$ anywhere between min $T_E$ and max $T_E$; in the example shown, $T_E'$ is line 3. Each case represents a printing strategy for a set of rendering costs $T_i$ that have been computed for each of the bands i on a page before printing starts.

Case 1 shows a situation where the rendering cost $T_i$ for a band i is less than the minimum $T_E$ (i.e., $T_i$<min $T_E$). In this case, the band is marked "raceable". Upon printing, the band print time of the print engine 40 preferably is set to less than $T_E'$, and most preferably is set to the minimum $T_E$ (i.e., fastest printing) for that band, since that band can be rendered on-the-fly, thus "racing" the print engine 40.

Case 2 shows a situation where the rendering cost $T_i$ for a band i is greater than or equal to the minimum $T_E$ but less than or equal to the maximum $T_E$ (i.e., min $T_E \leq T_i \leq$ max $T_E$). In this case, the band is marked raceable. Upon printing, the band print time of the print engine 40 preferably is set to the lowest $T_E$ that is greater than or equal to $T_i$ for that band. If adequate memory is available, any raceable band i can be pre-rendered rather than raced and the print band time set to the minimum $T_E$ for that band.

Case 3 shows a situation where the rendering cost $T_i$ for at least one band i is greater than the maximum $T_E$ (i.e., max $T_E<T_i$). In this case, each such band cannot be rendered within the slowest available print engine speed (maximum $T_E$). Accordingly, the best strategy is to mark each such band as non-raceable and pre-render each such band in memory (possibly using compression). Upon printing, the band print time of the print engine 40 is set to less than the maximum $T_E$, preferably to less than $T_E'$, and most preferably to the minimum $T_E$, for fastest printing.

After all bands i are marked as raceable or rendered, printing commences, with the raceable bands being rendered on-the-fly. For each band i, the band print time is set to the previously computed value for that band, as described above.

As noted above, sub-optimum but still beneficial values of $T_E$ can be selected if desired. For example, in case 2, a slower print band time (higher $T_E$) could be selected rather than the lowest $T_E$ that is greater than the maximum $T_i$.

Figure 8:
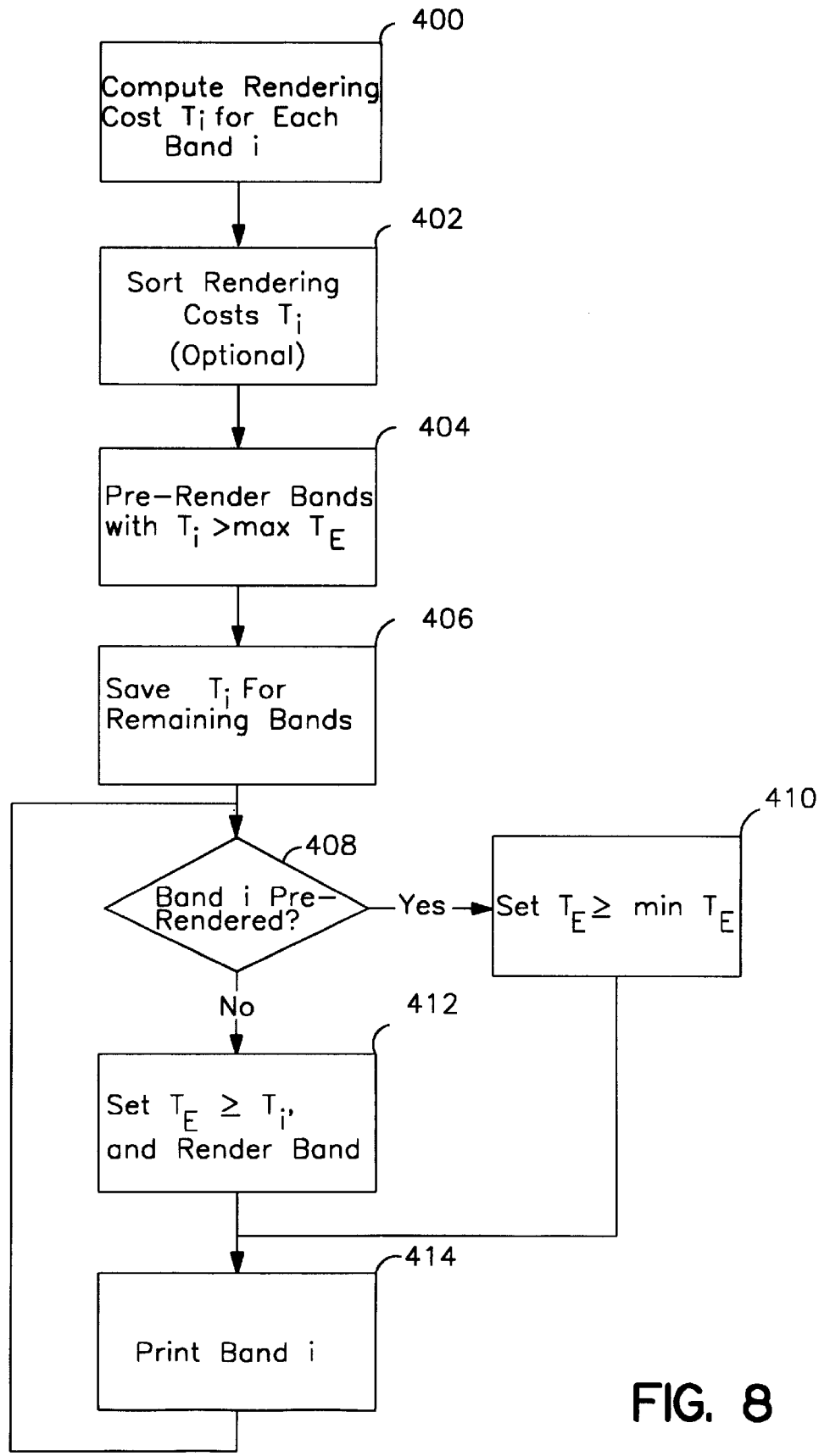
FIG. 8 is a flowchart showing the steps of a sophisticated version of the second preferred embodiment of the present invention.

Each of the cases described above can be implemented in a manner similar to the flowchart shown in FIG. 6, taking into account tests for each of the conditions specified above and shown in FIG. 7. However, the following procedure, shown in FIG. 8, is mathematically equivalent and is the preferred method of implementing the second embodiment of the present invention:

(1) compute the rendering costs (time) $T_i$ for all bands on a page (Step 400);
(2) sort the rendering costs from a minimum $T_i$ to a maximum $T_i$ (Step 402) (this step is optional, and is for ease of computation of the remaining steps);
(3) pre-render all bands with $T_i$>max $T_E$ (Step 404);
(4) save $T_i$ for each band with $T_i \leq$ max $T_E$ (Step 406);
(5) for each pre-rendered band i (Step 408), set the band print time $T_E$ of the print engine 40 to any desired $T_E$, and preferably to the minimum $T_E$ (Step 410), and print such band (Step 414); and
(6) for each other band i (Step 408), set the band print time $T_E$ of the print engine 40 to be greater than the saved $T_i$ for that band, and preferably to the lowest $T_E \geq T_i$, then render the band (Step 412), and then print the band (Step 414).

In step (3), bands having $T_i$=max $T_E$ could be pre-rendered instead of raced, but at the cost of extra memory usage. Again, if adequate memory is available, any raceable band i can be pre-rendered rather than raced and the print band time set to the optimum $T_E$ for that band.

Third Preferred Embodiment

A variation of the invention may be used where the speed of a print engine 40 cannot be changed for each band, but can be changed for spaced-apart bands or groups of bands (this might occur, for example, because changing speeds requires an appreciable amount of time). For example, suppose inner bands j, j+1, j+2 on a page of n bands are empty. Before printing, the band print time of the print engine 40 is set to the best $T_E$ for preceding bands 1, . . . j−1 (in effect, this set of bands is a "subpage", and the time $T_E$ can be computed for each subpage as in the first embodiment described above). During bands j,j+1,j+2 (the empty bands, which may be considered a "blank" subpage), the band print time is reset as described above to the best $T_E$ for following bands j+3, . . . n (the next subpage). In the preferred embodiment, the definition of each subpage is dynamically determined. That is, the bands of a page are grouped into subpages based upon an analysis of the ability to change print engine speed between such subpages. Overall print speed should be improved. Again, sub-optimum but still beneficial values of $T_E$ can be selected if desired.

Using a slightly different notation, the procedure of this embodiment can be described more generally as follows for a page-oriented output device that has a print engine with a selectable band print time $T_E$ for subpages j of bands i, where the print band time can be changed between subpages:

(1) compute an estimated rendering time $T_i$ for each band i of a subpage j, where i=1, ... n;
(2) pre-render all bands i of a subpage j with $T_i >$ max $T_E$;
(3) compute max $T_i$ for all bands i of a subpage j with $T_i \leq$ max $T_E$, and set max $T_i$ to 0 if no such bands exist;
(4) for each subpage j of pre-rendered bands i, select the band print time $T_E$ to be greater than or equal to the minimum $T_E$; and
(5) for each other subpage j of bands i, select the band print time $T_E$ to be greater than or equal to the max $T_i$.

This algorithm is in fact the most general case of the first and second embodiments above. That is, by defining a subpage as being an entire page of bands (i.e., j=1, i=n), the above algorithm is the equivalent of the first preferred embodiment above. By defining a subpage as being a single band (i.e., j=n, i=1), the above algorithm is the equivalent of the second preferred embodiment above.

Software Implementation

The method of the invention may be implemented in hardware or software, or a combination of both. However, preferably, the method of the invention is implemented in computer programs executing on programmable processors each comprising a processor, a data storage system (including volatile and non-volatile memory and/or storage elements), at least one input device, and at least one output device, such as is shown in FIG. 2.

Each program is preferably implemented in a high level procedural or object oriented programming language to communicate with a processor. However, the programs can be implemented in assembly or machine language, if desired. In any case, the language may be a compiled or interpreted language.

Each such computer program is preferably stored on a storage media or device (e.g., ROM, flash RAM, or magnetic diskette) readable by a general or special purpose programmable processor, for configuring and operating the processor when the storage media or device is read by the processor to perform the procedures described herein. The inventive system may also be considered to be implemented as a processor-readable storage medium, configured with a computer program, where the storage medium so configured causes a processor to operate in a specific and predefined manner to perform the functions described herein.

A number of embodiments of the present invention have been described. Nevertheless, it will be understood that various modifications may be made without departing from the spirit and scope of the invention. For example, the present invention can be combined with the teachings set forth in co-pending patent application Ser. No. 08/021,190 to adjust the speed of the print engine 40 from most bands, while utilizing the various compression techniques of the cited patent application to handle particularly complex bands. More particularly, if $T_i$ substantially exceeds $T_E'$ for only one or a few bands, while $T_i$ exceeds $T_E'$ only slightly for most bands, then the present invention can be used to slow a printer down only for the latter bands, while the rendering and compression techniques of the co-pending patent application are used to process the former bands. This would provide somewhat greater throughput than if the printer were slowed to its lowest speed, particularly since the maximum $T_E$ for a particular page printer may be less than $T_i$ for an especially complex band. Accordingly, it is to be understood that the invention is not to be limited by the specific illustrated embodiments, but only by the scope of the appended claims.

What is claimed is:

1. A method for efficiently rendering and printing a page of information comprising a plurality of bands n defined by a page description language by means of a page-oriented output device having a print engine with a selectable band print time $T_E$, comprising the steps of:
   (a) computing an estimated rendering time $T_i$ for each band i of a page, where i=1, ... n;
   (b) pre-rendering all bands with $T_i >$ max $T_E$, such pre-rendered bands being printable by the print engine within max $T_E$;
   (c) computing max $T_i$ for all bands with $T_i \leq$ max $T_E$, and setting max $T_i$ to 0 if no such bands exist;
   (d) setting the selectable band print time $T_E$ of the print engine to be greater than or equal to max $T_i$; and
   (e) rendering each band with $T_i \leq$ max $T_E$ concurrently with printing of each such band, thereby permitting complete rendering and printing of all bands with $T_E \leq$ max $T_E$ and printing of all pre-rendered bands of the page within such band print time.

2. A method for efficiently rendering and printing a page of information comprising a plurality of bands n defined by a page description language by means of a page-oriented output device having a print engine with a selectable band print time $T_E$, comprising the steps of:
   (a) computing an estimated rendering time $T_i$ for at least one band i of a page, where i=1, ... n;
   (b) pre-rendering each band i with $T_i >$ max $T_E$, such pre-rendered bands being printable by the print engine within max $T_E$;
   (c) saving $T_i$ for each band i with $T_i \leq$ max $T_E$;
   (d) for each pre-rendered band i, setting the selectable band print time $T_E$ of the print engine to be greater than or equal to the minimum $T_E$; and
   (e) for each other band i, setting the selectable band print time $T_E$ of the print engine to be greater than or equal to the saved $T_i$ for such band, and rendering each such band concurrently with printing of such band.

3. The method of claim 2, further comprising the steps of:
   (a) determining if a page is blank;
   (b) if a page is blank, then speeding the print engine through that page.

4. A method for efficiently rendering and printing a page of information comprising a plurality of bands n defined by a page description language by means of a page-oriented output device having a print engine with a nominal band print time $T_E'$, comprising the steps of:
   (a) computing an estimated rendering time $T_i$ for at least one band i of a page, where i=1, ... n;
   (b) if $T_i$ is greater than $T_E'$ for band i, then slowing the print engine sufficiently during printing of band i to permit complete rendering and printing of band i.

5. The method of claim 4, further comprising the steps of:
   (a) determining if a band i is has a $T_i$ less than $T_E'$;
   (b) if a band i has a $T_i$ less than $T_E'$, then speeding the print engine through band i.

6. The method of claim 4, further comprising the steps of:
   (a) determining if each $T_i$ is greater than a maximum $T_E$ for the print engine;
   (b) if $T_i$ is greater than such maximum $T_E$, then rendering the corresponding band i as print data in a memory before transmitting such data to the print engine.

7. The method of claim 6, further comprising the steps of:
   (a) if the print data exceeds a capacity of the memory, then compressing the print data.

8. The method of claim 7, wherein the compression is lossless.

9. The method of claim 7, wherein the compression is lossy.

10. A printer apparatus for efficiently rendering and printing a page of information comprising a plurality of bands n defined by a page description language by means of a page-oriented output device having a print engine with a selectable band print time $T_E$, comprising:
   (a) means for computing an estimated rendering time $T_i$ for each band i of a page, where i=1, ... n;
   (b) means for pre-rendering all bands with $T_i > \max T_E$, such pre-rendered bands being printable by the print engine within max $T_E$;
   (c) means for computing max $T_i$ for all bands with $T_i \leq \max T_E$, and setting max $T_i$ to 0 if no such bands exist;
   (d) means for setting the selectable band print time $T_E$ of the print engine to be greater than or equal to max $T_i$; and
   (e) means for rendering each band with $T_i \leq \max T_E$ concurrently with printing of each such band, thereby permitting complete rendering and printing of all bands with $T_i \leq \max T_E$ and printing of all pre-rendered bands of the page within such band print time.

11. A printer apparatus for efficiently rendering and printing a page of information comprising a plurality of bands n defined by a page description language by means of a page-oriented output device having a print engine with a selectable band print time $T_E$, comprising:
   (a) means for computing an estimated rendering time $T_i$ for at least one band i of a page, where i=1, ... n;
   (b) means for pre-rendering each band i with $T_i > \max T_E$, such pre-rendered bands being printable by the print engine within max $T_E$;
   (c) means for saving $T_i$ for each band i with $T_i \leq \max T_E$;
   (d) means for setting the selectable band print time $T_E$ of the print engine to be greater than or equal to the minimum $T_E$ for each pre-rendered band i; and
   (e) means for setting the selectable band print time $T_E$ of the print engine to be greater than or equal to the saved $T_i$ for each other band i, and rendering each such band concurrently with printing of such band.

12. The printer apparatus of claim 11, further comprising:
   (a) means for determining if a page is blank;
   (b) means for speeding the print engine through each blank page.

13. A printer apparatus for efficiently rendering and printing a page of information comprising a plurality of bands n defined by a page description language by means of a page-oriented output device having a print engine with a nominal band print time $T_E'$, comprising:
   (a) means for computing an estimated rendering time $T_i$ for at least one band i of a page, where i=1, ... n;
   (b) means for slowing the print engine sufficiently during printing of band i to permit complete rendering and printing of band i if $T_i$ is greater than $T_E'$.

14. The printer apparatus of claim 13, further comprising:
   (a) means for determining if a band i is blank;
   (b) means for speeding the print engine through band i if such band is blank.

15. The printer apparatus of claim 13, further comprising:
   (a) means for determining if each $T_i$ is greater than a maximum $T_E$ for the print engine;
   (b) means for rendering and compressing the corresponding band i if $T_i$ is greater than such maximum $T_E$.

16. A computer program, residing on a computer-readable medium, for efficiently rendering and printing a page of information comprising a plurality of bands n defined by a page description language by means of a page-oriented output device having a print engine with a selectable band print time $T_E$, the computer program comprising instructions for causing a processor within the page-oriented output device to:
   (a) compute an estimated rendering time $T_i$ for each band i of a page, where i=1, ... n;
   (b) pre-render all bands with $T_i > \max T_E$, such pre-rendered bands being printable by the print engine within max $T_E$;
   (c) compute max $T_i$ for all bands with $T_i \leq \max T_E$, and set max $T_i$ to 0 if no such bands exist;
   (d) set the selectable band print time $T_E$ of the print engine to be greater than or equal to the $T_i$; and
   (e) render each band with $T_i \leq \max T_E$ concurrently with printing of each such band, thereby permitting complete rendering and printing of all bands with $T_i \max T_E$ and printing of all pre-rendered bands of the page within such band print time.

17. A computer program, residing on a computer-readable medium, for efficiently rendering and printing a page of information comprising a plurality of bands n defined by a page description language by means of a page-oriented output device having a print engine with a selectable band print time $T_E$, the computer program comprising instructions for causing a processor within the page-oriented output device to:
   (a) compute an estimated rendering time $T_i$ for at least one band i of a page, where i=1, ... n;
   (b) pre-render each band i with $T_i > \max T_E$, such pre-rendered bands being printable by the print engine within max $T_E$;
   (c) save $T_i$ for each band i with $T_i \leq \max T_E$;
   (d) for each pre-rendered band i, set the selectable band print time $T_E$ of the print engine to be greater than or equal to the minimum $T_E$; and
   (e) for each other band i, set the selectable band print time $T_E$ of the print engine to be greater than or equal to the saved $T_i$ for such band, and render each such band concurrently with printing of such band.

18. The computer program of claim 17, further comprising instructions for causing a processor within the page-oriented output device to:
   (a) determine if a page is blank;
   (b) if a page is blank, then speed the print engine through that page.

19. A computer program, residing on a computer-readable medium, for efficiently rendering and printing a page of information comprising a plurality of bands n defined by a page description language by means of a page-oriented output device having a print engine with a nominal band print time $T_E'$, the computer program comprising instructions for causing a processor within the page-oriented output device to:
   (a) compute an estimated rendering time $T_i$ for at least one band i of a page, where i=1, ... n;
   (b) if $T_i$ is greater than $T_E'$ for band i, then slow the print engine sufficiently during printing of band i to permit complete rendering and printing of band i.

20. The computer program of claim 19, further comprising instructions for causing a processor within the page-oriented output device to:

(a) determine if a band i is blank;

(b) if a band i is blank, then speed the print engine through band i.

21. The computer program of claim 19, further comprising instructions for causing a processor within the page-oriented output device to:

(a) determine if each $T_i$ is greater than a maximum $T_E$ for the print engine;

(b) if $T_i$ is greater than such maximum $T_E$, then render and compress the corresponding band i.

22. A method for efficiently rendering and printing a page of information by means of a page-oriented output device having a print engine having a variable speed, comprising the steps of:

(a) determining if a page is blank;

(b) if a page is blank, then speeding the print engine through that page.

23. A printer apparatus for efficiently rendering and printing a page of information by means of a page-oriented output device having a print engine having a variable speed, comprising:

(a) means for determining if a page is blank;

(b) means for speeding the print engine through each blank page.

24. A computer program, residing on a computer-readable medium, for efficiently rendering and printing a page of information by means of a page-oriented output device having a print engine having a variable speed, the computer program comprising instructions for causing a processor within the page-oriented output device to:

(a) determine if a page is blank;

(b) if a page is blank, then speed the print engine through that page.

25. A method for efficiently rendering and printing a page of information comprising a plurality of bands n defined by a page description language by means of a page-oriented output device having a print engine with a selectable band print time $T_E$ for subpages j of bands i, where the print band time can be changed between subpages, comprising the steps of:

(a) computing an estimated rendering time $T_i$ for each band i of a subpage j, where i=1, . . . n;

(b) pre-rendering all bands i of a subpage j with $T_i$>max $T_E$, such pre-rendered bands being printable by the print engine within max $T_E$;

(c) computing max $T_i$ for all bands i of a subpage j with $T_i \leq$ max $T_E$, and setting max $T_i$ to 0 if no such bands exist;

(d) for each subpage j of pre-rendered bands i, setting the selectable band print time $T_E$ of the print engine to be greater than or equal to the minimum $T_E$; and (e) for each other subpage j of bands i, setting the selectable band print time $T_E$ of the print engine to be greater than or equal to the max $T_i$ for the bands i in such subpage j.

26. A printer apparatus for efficiently rendering and printing a page of information comprising a plurality of bands n defined by a page description language by means of a page-oriented output device having a print engine with a selectable band print time $T_E$ for subpages j of bands i, where the print band time can be changed between subpages, comprising:

(a) means for computing an estimated rendering time $T_i$ for each band i of a subpage j, where i=1, . . . n;

(b) means for pre-rendering all bands i of a subpage j with $T_i$>max $T_E$, such pre-rendered bands being printable by the print engine within max $T_E$;

(c) means for computing max $T_i$ for all bands i of a subpage j with $T_i \leq$ max $T_E$, and setting max $T_i$ to 0 if no such bands exist;

(d) means for setting the selectable band print time $T_E$ of the print engine to be greater than or equal to the minimum $T_E$ for each subpage j of pre-rendered bands i; and (e) means for setting the selectable band print time $T_E$ of the print engine to be greater than or equal to the max $T_i$ for the bands i of each other subpage j.

27. A computer program, residing on a computer-readable medium, for efficiently rendering and printing a page of information comprising a plurality of bands n defined by a page description language by means of a page-oriented output device having a print engine with a selectable band print time $T_E$ for subpages j of bands i, where the print band time can be changed between subpages, the computer program comprising instructions for causing a processor within the page-oriented output device to:

(a) compute an estimated rendering time $T_i$ for each band i of a subpage j, where i=1, . . . n;

(b) pre-render all bands i of a subpage j with $T_i$>max $T_E$, such pre-rendered bands being printable by the print engine within max $T_E$;

(c) compute max $T_i$ for all bands i of a subpage j with $T_i \leq$ max $T_E$, and setting max $T_i$ to 0 if no such bands exist;

(d) for each subpage j of pre-rendered bands i, set the selectable band print time $T_E$ of the print engine to be greater than or equal to the minimum $T_E$; and (e) for each other subpage j of bands i, set the selectable band print time $T_E$ of the print engine to be greater than or equal to the max $T_i$ for the bands i in such subpage j.

* * * * *